United States Patent
Retersdorf et al.

(10) Patent No.: US 10,745,139 B2
(45) Date of Patent: Aug. 18, 2020

(54) SIMULTANEOUS DUAL ENGINE BLEED THERMAL MANAGEMENT SYSTEM

(71) Applicant: Hamilton Sundstrand Corporation, Charlotte, NC (US)

(72) Inventors: Alan Retersdorf, Avon, CT (US); Tony Ho, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 27 days.

(21) Appl. No.: 16/020,449

(22) Filed: Jun. 27, 2018

(65) Prior Publication Data

US 2020/0002007 A1 Jan. 2, 2020

(51) Int. Cl.
| | | |
|---|---|---|
| *B64D 13/04* | (2006.01) | |
| *B64D 13/08* | (2006.01) | |
| *B64D 13/06* | (2006.01) | |
| *B64D 13/02* | (2006.01) | |
| *F02C 6/08* | (2006.01) | |

(52) U.S. Cl.
CPC ............ *B64D 13/06* (2013.01); *B64D 13/02* (2013.01); *F02C 6/08* (2013.01); *B64D 2013/0611* (2013.01); *B64D 2013/0618* (2013.01); *F05D 2260/213* (2013.01)

(58) Field of Classification Search
CPC .......... F04D 29/42; B64F 1/364; F24F 3/153; B64D 13/06; B64D 13/02; B64D 2013/0611; B64D 2013/0618; F02C 6/08; F05D 2260/213
USPC ........................................................ 165/234
See application file for complete search history.

(56) References Cited

U.S. PATENT DOCUMENTS

| | | | |
|---|---|---|---|
| 3,177,679 A * | 4/1965 | Quick .................... | B64D 13/06 |
| | | | 62/402 |
| 3,222,883 A * | 12/1965 | Glaspie .................. | F24F 3/153 |
| | | | 62/172 |
| 5,704,218 A | 1/1998 | Christians et al. | |
| 7,607,318 B2 | 10/2009 | Lui et al. | |
| 9,169,024 B2 | 10/2015 | Voinov | |
| 2015/0251765 A1 | 9/2015 | Jonqueres et al. | |
| 2015/0275758 A1 | 10/2015 | Foutch et al. | |
| 2017/0233081 A1 | 8/2017 | Sautron et al. | |
| 2018/0065760 A1* | 3/2018 | Anderson ............... | B64F 1/364 |
| 2018/0073515 A1* | 3/2018 | Kanzaka ................. | F04D 29/42 |
| 2018/0128176 A1 | 5/2018 | Staubach et al. | |

FOREIGN PATENT DOCUMENTS

EP 2862803 A1 4/2015

OTHER PUBLICATIONS

European Search Report; Application No. 19171570.5; dated Sep. 2, 2019; 11 Pages.

\* cited by examiner

*Primary Examiner* — Davis D Hwu
(74) *Attorney, Agent, or Firm* — Cantor Colburn LLP

(57) ABSTRACT

An environmental control system of an aircraft includes at least one heat exchanger and a compression device arranged in fluid communication with the at least one heat exchanger. The compression device includes a plurality of components including a first component and a second component coupled by a shaft. A first bleed port is arranged in fluid communication with the first component and a second bleed port, distinct from the first bleed port, is arranged in fluid communication with the second component.

15 Claims, 4 Drawing Sheets

SIMULTANEOUS DUAL ENGINE BLEED THERMAL MANAGEMENT SYSTEM

STATEMENT OF FEDERAL SUPPORT

This invention was made with Government support under FA8650-16-D-2617 awarded by the United States Air Force. The Government has certain rights in the invention.

BACKGROUND

Embodiments of the present disclosure relate to an environmental control system for an aircraft, and more particularly, to an environmental control system capable of extracting both high and low pressure compressed air for uses on an aircraft.

Aircraft commonly employ an environmental control system to pressurize a passenger cabin of the aircraft and/or thermal anti-icing systems to provide heated air for anti-icing applications. Air supply to these systems is typically provided by bleed air extracted from or provided by a compressor of an aircraft engine. To meet pressure and/or temperature demands of the various aircraft systems, bleed air is often extracted from a high stage of a low-pressure compressor of the aircraft engine. Although systems exist having multiple bleed ports configured to deliver bleed air having various temperatures and/or pressures to the system, only one of these ports is provided as a source at any given time. As a result, operation of the system is limited by the distinct temperatures and pressures available from each port individually.

BRIEF DESCRIPTION

According to an embodiment, an environmental control system of an aircraft includes at least one heat exchanger and a compression device arranged in fluid communication with the at least one heat exchanger. The compression device includes a plurality of components including a first component and a second component coupled by a shaft. A first bleed port is arranged in fluid communication with the first component and a second bleed port, distinct from the first bleed port, is arranged in fluid communication with the second component.

In addition to one or more of the features described above, or as an alternative, in further embodiments a first medium drawn from the first bleed port has a first pressure and a second medium drawn from the second port has a second pressure, the second pressure being higher than the first pressure.

In addition to one or more of the features described above, or as an alternative, in further embodiments at least one of the first bleed port and the second bleed port is in fluid communication with an engine of the aircraft.

In addition to one or more of the features described above, or as an alternative, in further embodiments at least one of the first bleed port and the second bleed port is arranged in fluid communication with a low pressure spool of a compressor of the engine.

In addition to one or more of the features described above, or as an alternative, in further embodiments at least one of the first bleed port and the second bleed port is in fluid communication with an auxiliary power unit of the aircraft.

In addition to one or more of the features described above, or as an alternative, in further embodiments the first component is a compressor and the second component is a turbine.

In addition to one or more of the features described above, or as an alternative, in further embodiments the plurality of components of the compression device further includes another turbine arranged downstream from and in fluid communication with the compressor.

In addition to one or more of the features described above, or as an alternative, in further embodiments the environmental control system is operable in a first mode and a second mode.

In addition to one or more of the features described above, or as an alternative, in further embodiments the environmental control system is operable in a first mode during conditions with a medium or high engine power setting and/or a low environmental control system demand.

In addition to one or more of the features described above, or as an alternative, in further embodiments conditions with a medium or high engine power setting and/or a low environmental control system demand include at least one of a cruise and climb of the aircraft.

In addition to one or more of the features described above, or as an alternative, in further embodiments during operation of the environmental control system in the first mode, fluid from the first bleed port is provided to the first component, but no fluid from the second bleed port is provided to the second component.

In addition to one or more of the features described above, or as an alternative, in further embodiments the environmental control system is operable in a second mode during conditions with a low engine power setting and/or a high environmental control system demand.

In addition to one or more of the features described above, or as an alternative, in further embodiments conditions with a medium or high engine power setting and/or a low environmental control system demand include engine idle conditions including taxi, or descent.

In addition to one or more of the features described above, or as an alternative, in further embodiments during operation of the environmental control system in the second mode, fluid from the first bleed port is provided to the first component, and fluid from the second bleed port is provided to the second component simultaneously.

In addition to one or more of the features described above, or as an alternative, in further embodiments the at least one heat exchanger includes a secondary heat exchanger is positioned downstream from the compressor.

In addition to one or more of the features described above, or as an alternative, in further embodiments the at least one heat exchanger includes a first precooler arranged upstream from the first component and a second precooler arranged upstream from the second component.

In addition to one or more of the features described above, or as an alternative, in further embodiments ram air is arranged in a heat exchange relationship with a first medium provided from the first bleed port in the first precooler.

In addition to one or more of the features described above, or as an alternative, in further embodiments ram air is arranged in a heat exchange relationship with a second medium provided from the second bleed port in the second precooler.

In addition to one or more of the features described above, or as an alternative, in further embodiments the second bleed port is selectively operable to tune a flow of fluid provided to the compression device.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
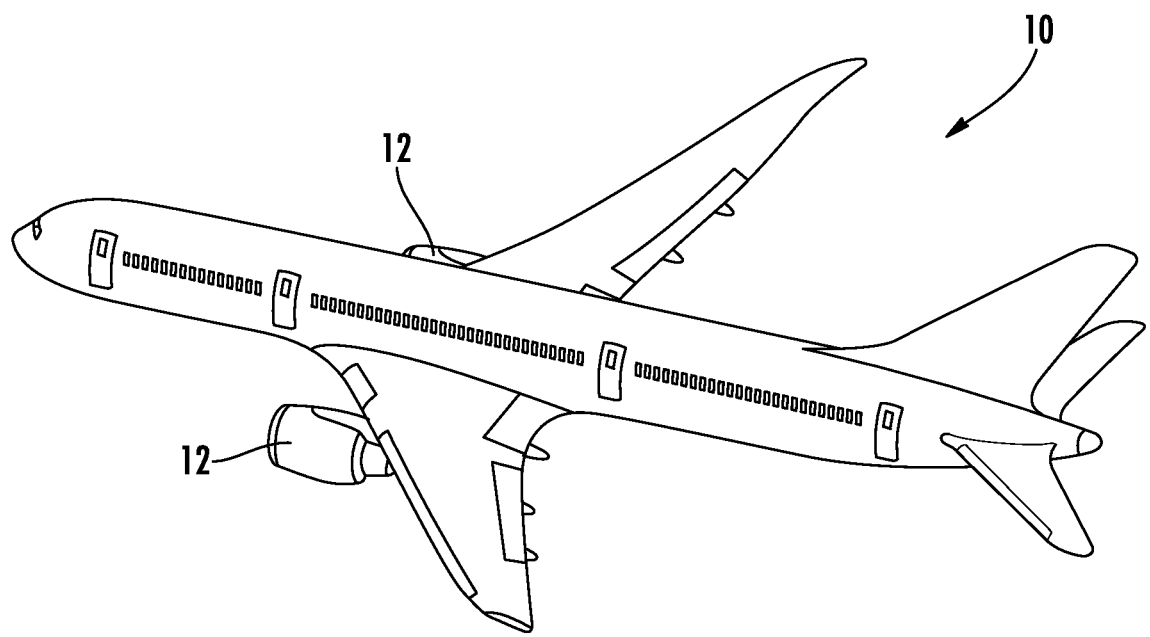
FIG. 1 is a perspective view of an example of an aircraft.

With reference now to FIG. 1, an example of an aircraft 10 is illustrated. As shown, the aircraft 10 has a plurality of engines 12, such as gas turbine engines for example. Although two engines 12 are illustrated in the FIG., it should be understood that an aircraft 10 having any number of engines 12, including a single engine, or more than two engines is within the scope of the disclosure.

Figure 2:
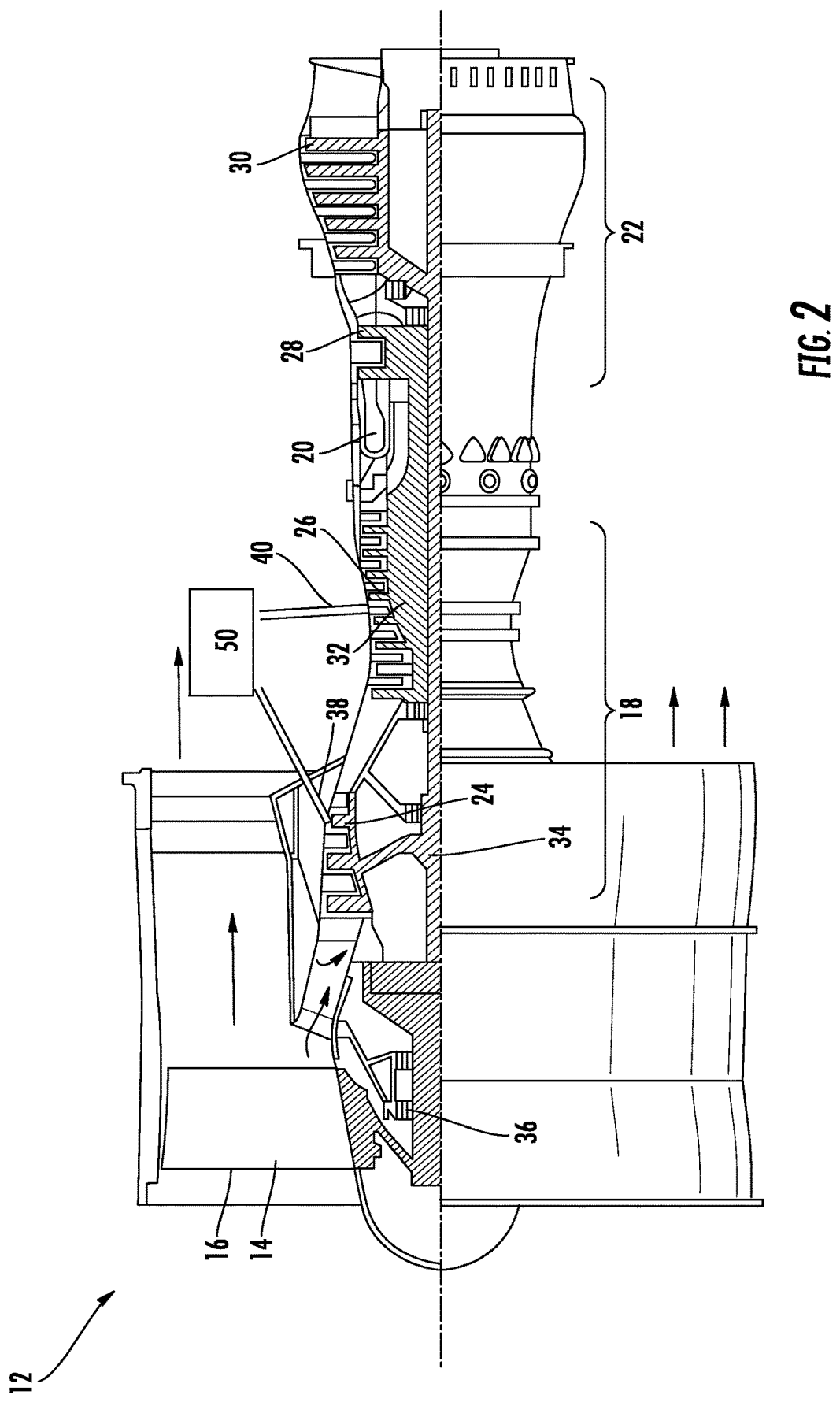
FIG. 2 is a cross-sectional view of an example of a gas turbine engine of an aircraft.

FIG. 2 is a cross-sectional view of an example of an aircraft engine 12 of FIG. 1. The engine 12 includes a fan 14 having a plurality of fan blades 16, a compressor section 18, a combustor 20, and a turbine section 22. The compressor section 18 includes both a low pressure compressor 24 and a high pressure compressor 26 and the turbine section 22 similarly includes both a high pressure turbine 28 and a low pressure turbine 30. The high pressure compressor 26 is driven, via a first spool 32, by the high pressure turbine 28. The low pressure compressor 24 is driven, via a second spool 34, by the low pressure turbine 30. Also driven by the low pressure turbine 30 are the fan blades 16 of the fan 14, which fan is coupled to the second spool 34 via a gear 36.

Each engine 12 may employ a dedicated bleed air system, or alternatively, a common bleed air system, for providing compressed or pressurized air to one or more downstream systems, illustrated schematically at 50. Examples of the downstream systems 50 include but are not limited to, an environmental control system (ECS), a thermal anti-icing system (e.g., an engine and/or wing anti-icing system), etc. The bleed air system includes one or more taps or ports configured to extract air from various stages of the engine 12. In the non-limiting embodiment illustrated in FIG. 2, the system includes a first port 38 positioned adjacent the lower pressure compressor 24, and a second port 40 positioned adjacent the high pressure compressor 26. The indication of "low pressure" and "high pressure" with respect to the taps 38, 40 is therefore a relative term indicating that the high pressure tap 40 is at a location of higher pressure than the location of the low pressure tap 38. It should be understood that a bleed air system having more than two ports is also within the scope of the disclosure. Further, the first and second ports 38, 40 may be located at any position relative to the engine 12 such that the pressurized air drawn from one of the first and second port 38, 40 has a lower pressure and the pressurized air drawn from the other of the first and second port 38, 40 has a higher pressure. Although the engine and bleed system are illustrated and described herein with reference to an aircraft, it should be understood that engines used in other application, or alternative power sources, such as an auxiliary power unit are also contemplated herein.

Figure 3:
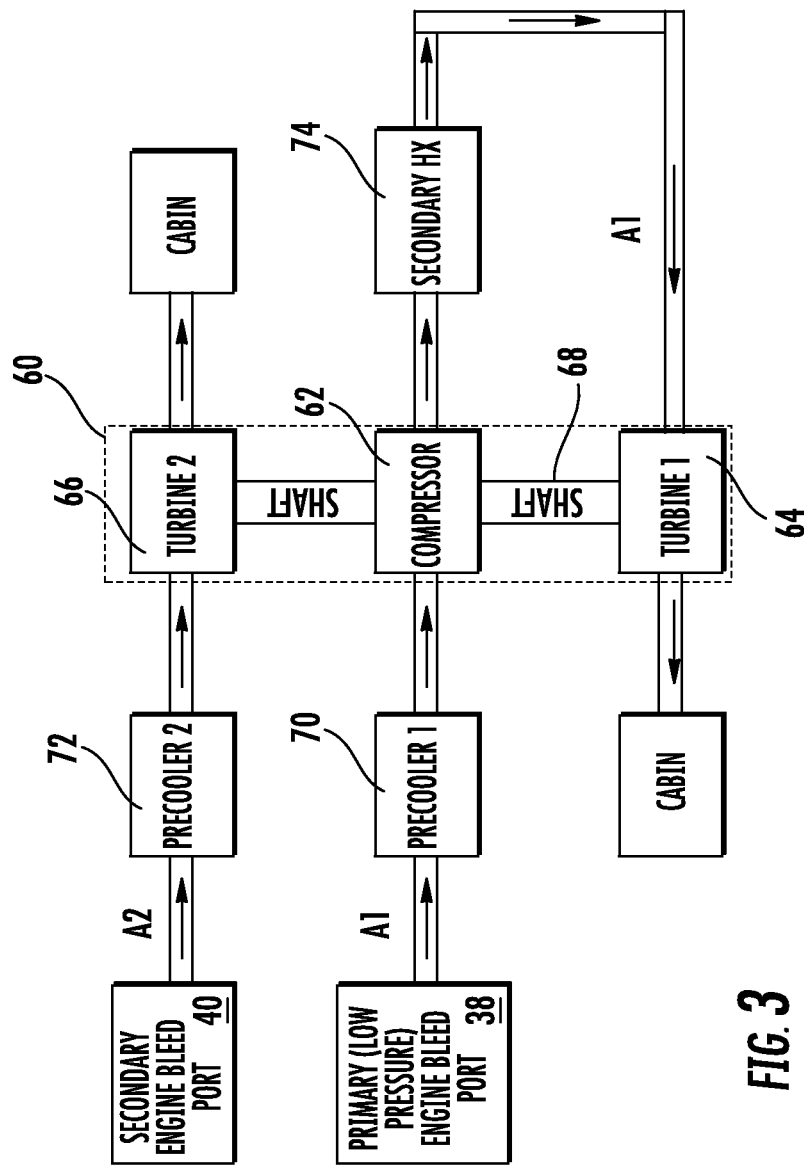
FIG. 3 is a schematic diagram of a portion of an environmental control system according to an embodiment.
Figure 4:
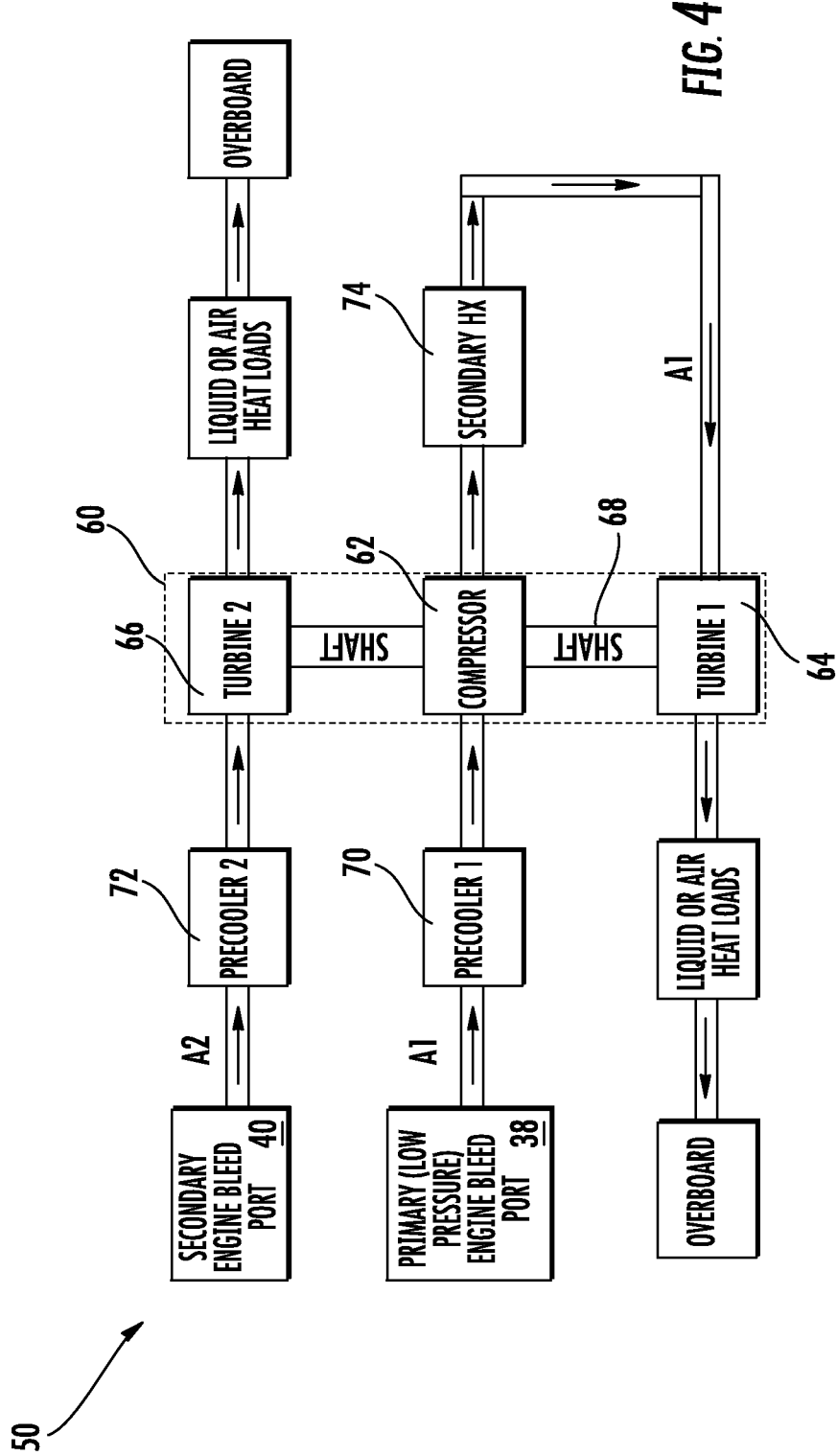
FIG. 4 is a schematic diagram of a portion of another environmental control system according to an embodiment.

With reference now to FIGS. 3 and 4, a schematic diagram of various embodiments of a downstream system 50, and more specifically a portion of an environmental control system (ECS) such as a pack for example, are depicted according to non-limiting embodiments. As shown in each of the FIGS., the system 50 is configured to receive a first medium A1 having a first pressure via a first port, such as port 38 for example, and receive a second medium A2 having a second pressure via a second port, such as port 40 for example. As previously described, in embodiments where the environmental control system is used in an aircraft application, the first and second mediums A1, A2 are bleed air, which is pressurized air originating from i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

With reference to FIG. 3, the ECS 50 includes a compression device 60. In the illustrated, non-limiting embodiment, the compression device 60 of the ECS 50 is a mechanical device that includes components for performing thermodynamic work on one or more mediums (e.g., extracts work from or applies work to the first medium A1 and/or the second medium A2 by raising and/or lowering pressure and by raising and/or lowering temperature). Examples of the compression device 60 include, but are not limited to, an air cycle machine, such as a three-wheel or four-wheel air cycle machine.

As shown, the compression device 60 includes a compressor 62, a first turbine 64, and a second turbine 66 operably coupled to one another via a shaft 68. The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 62 is configured to receive and pressurize the first medium A1. The first turbine 64 and the second turbine 66 are mechanical devices that expand a medium and extract work therefrom (also referred to as extracting energy). In the compression device 60, the turbines 64, 66 drive the compressor 62 via the shaft 68.

The system 50 additionally includes one or more heat exchangers or devices configured to provide efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

As shown, the one or more heat exchangers includes a first precooler 70 arranged upstream from the compressor 62 and a second precooler 72 arranged upstream from the second turbine 64. In an embodiment, within the precoolers 70, 72, ram air, such as outside air for example, acts as a heat sink to cool a medium passing there through, for example the first medium A1 and/or the second medium A2. Although operation of the precoolers 70, 72 is described herein with respect to ram air, it should be understood that any suitable cooling medium, such as a fluid from another system of the aircraft for example, may be supplied to either of the precoolers 70, 72 to cool the first and/or second mediums A1, A2. The system 50 additionally includes a secondary heat exchanger 74 arranged downstream from the compressor 62. Ram air, or a fluid from another system of the aircraft may be arranged in a heat exchange relationship with the fluid within the secondary heat exchanger 74.

Referring now to FIG. 4, the illustrated system 50 is substantially similar to the system 50 of FIG. 3. However, the system 50 of FIG. 4 additionally includes at least one of a first load heat exchanger 76 arranged downstream from the first turbine 64, and a second load heat exchanger 78 arranged downstream from the second turbine 66. Within the first and second load heat exchangers 76, 78, the first medium and second medium A1, A2 may be used to transfer heat to or from another fluid associated with the aircraft, such as a coolant used to cool aircraft avionics for example.

The systems 50 disclosed in FIGS. 3 and 4 are operable in a plurality of modes, selectable based on a flight condition of the aircraft. For example, the system 50 may be operable in a first mode when the aircraft is at a high altitude, in a cruise condition, or during a climb, and may be operable in a second mode when the aircraft is at a low altitude or on the ground, such as during idle, taxi or take-off for example, or during descent.

The first mode of the system 20 may be considered a medium or high engine power/low ECS demand mode. The medium or high engine power/low ECS demand mode can be used at high altitude, cruise, and climb flight conditions. Depending on the cooling demand of the aircraft, the amount of bleed air needed to meet one or more demands of the aircraft can be reduced. Accordingly, during operation of the system in the first mode, the first bleed port 38 is open, and a low temperature, low pressure first medium A1 is provided to a first fluid flow path of the system. In an embodiment, the low pressure first medium A1 is drawn from a low pressure spool of an engine compressor. It should be noted that during the first mode of operation, the second bleed port 40 is not open, or is open only a minimal amount sufficient to prevent a stall or malfunction of the second turbine 66.

Within the first fluid flow path, the first medium A1 from the first bleed port 38 is supplied to the first precooler 70, where the first medium is cooled via a flow of ram air or other available aircraft heatsinks. From the first precooler 70, the first medium A1 is supplied to the compressor 62 of the compression device 60. The act of compressing the first medium A1, heats the first medium A1. The compressed first medium A1 then enters the secondary heat exchanger 74 where the first medium A1 is further cooled, such as by a flow of ram air for example.

From the secondary heat exchanger 74, the cool first medium A1 is provided to the first turbine 64. The cool, high pressure first medium A1 is expanded across the turbine 64 and work extracted from the cool high pressure air. This extracted work drives the compressor 62 used to compress the first medium A1, upstream from the first turbine 64. From the first turbine 64, the first medium is provided to one or more downstream loads. In the embodiment of FIG. 3, the first medium is used to condition the cabin of the aircraft. However, in the embodiment of FIG. 4, the first medium A1 may be sent to other loads of the aircraft, such as to one or more heat exchangers, such as the first load heat exchanger 76 for example, before being exhausted overboard.

During operation in the second mode, the flow of first medium A1 along the first fluid flow path remains the same as in the first mode. The second mode may be considered a low engine power/high ECS demand mode that can be used in engine idle settings such as taxi and descent. However, in the second mode, the second bleed port 40 is also open such that a second medium A2 is provided to a second fluid flow path of the system 50. In an embodiment, the high pressure second medium A2 is drawn from another portion of the engine compressor, or alternatively, from the fan of the engine. Accordingly, the pressure of the second medium A2 may be higher or lower than the pressure of the first medium A1. As shown, the first fluid flow path and a second fluid flow path of the ECS 50 are arranged in parallel. However, embodiments where these flow paths intersect one another are also within the scope of the disclosure.

Within the second fluid flow path, the second medium A2 from the second bleed port 40 is provided to the second precooler 72, where the second medium is at least partially cooled via a flow of ram air or other available aircraft heat sinks. From the second precooler 72, the second medium A2 is provided to second turbine 66. The cool, high pressure second medium A2 is expanded across the turbine 66 and work is extracted from the cool high pressure air. This extracted work drives the compressor 62 used to compress the first medium A1. From the second turbine 66, the second medium A2 is provided to one or more downstream loads, such as to the cabin of the aircraft. Alternatively, the second medium A2 may be supplied to another loads of the aircraft, such as to one or more heat exchangers, such as the first load heat exchanger 76 for example, before being exhausted overboard.

A system 50 having a first and second bleed port 38, 40 arranged in fluid communication with a first fluid flow path and a second fluid flow path, respectively, of an environmental control system has enhanced flexibility and adaptability compared to existing environmental control systems. Inclusion of a second bleed port 40 selectively operable to provide a higher pressure medium allows various portions the system 50, and specifically the components of the compression device 60, to receive a fluid flow having an optimal temperature or pressure associated with that component. Such optimization results in improved system performance, providing fuel burn benefits and potential volume and/or weight savings.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of an aircraft comprising:
   at least one heat exchanger;
   a compression device arranged in fluid communication with the at least one heat exchanger, the compression device including a plurality of components including a first component and a second component coupled by a shaft;
a first bleed port arranged in fluid communication with the first component; and
a second bleed port, distinct from the first bleed port, arranged in fluid communication with the second component;
wherein the at least one heat exchanger includes a first precooler arranged upstream from the first component and a second precooler arranged upstream from the second component, and ram air is arranged in a heat exchange relationship with a first medium provided from the first bleed port in the first precooler;
wherein the environmental control system is operable in a first mode and a second mode, and during operation in the second mode, fluid from the first bleed port is provided to the first component and fluid from the second bleed port is provided to the second component simultaneously.

2. The environmental control system of claim 1, wherein a first medium drawn from the first bleed port has a first pressure and a second medium drawn from the second port has a second pressure, the second pressure being higher than the first pressure.

3. The environmental control system of claim 1, wherein at least one of the first bleed port and the second bleed port is in fluid communication with an engine of the aircraft.

4. The environmental control system of claim 3, wherein at least one of the first bleed port and the second bleed port is arranged in fluid communication with a low pressure spool of a compressor of the engine.

5. The environmental control system of claim 1, wherein at least one of the first bleed port and the second bleed port is in fluid communication with an auxiliary power unit of the aircraft.

6. The environmental control system of claim 1, wherein the first component is a compressor and the second component is a turbine.

7. The environmental control system of claim 4, wherein the plurality of components of the compression device further includes another turbine arranged downstream from and in fluid communication with the compressor.

8. The environmental control system of claim 1, wherein the environmental control system is operable in a first mode during conditions with a medium or high engine power setting and/or a low environmental control system demand.

9. The environmental control system of claim 8, wherein conditions with a medium or high engine power setting and/or a low environmental control system demand include at least one of a cruise and climb of the aircraft.

10. The environmental control system of claim 1, wherein during operation of the environmental control system in the first mode, fluid from the first bleed port is provided to the first component, but no fluid from the second bleed port is provided to the second component.

11. The environmental control system of claim 1, wherein the environmental control system is operable in a second mode during conditions with a low engine power setting and/or a high environmental control system demand.

12. The environmental control system of claim 11, wherein conditions with a medium or high engine power setting and/or a low environmental control system demand include engine idle conditions including taxi, or descent.

13. The environmental control system of claim 1, wherein the at least one heat exchanger includes a secondary heat exchanger is positioned downstream from the compressor.

14. The environmental control system of claim 1, wherein ram air is arranged in a heat exchange relationship with a second medium provided from the second bleed port in the second precooler.

15. The environmental control system of claim 1, wherein the second bleed port is selectively operable to tune a flow of fluid provided to the compression device.

* * * * *